(12) United States Patent
Smith

(10) Patent No.: US 6,891,944 B1
(45) Date of Patent: May 10, 2005

(54) SYSTEM AND METHOD OF AUTODIALING FOR LONG-DISTANCE ACCESS

(76) Inventor: David Matthew Smith, 929 Westbrook Dr., Plano, TX (US) 75075

( * ) Notice: Subject to any disclaimer, the term of this patent is extended or adjusted under 35 U.S.C. 154(b) by 553 days.

(21) Appl. No.: 09/657,917

(22) Filed: Sep. 8, 2000

Related U.S. Application Data
(60) Provisional application No. 60/153,039, filed on Sep. 10, 1999.

(51) Int. Cl.[7] .............................................. H04M 3/42
(52) U.S. Cl. ........................... 379/221.14; 379/355.01; 379/93.26
(58) Field of Search .......................... 379/93.01, 93.26, 379/226.01, 221.01, 221.02, 221.14, 350, 352, 355.01–355.03, 355.05–356.01, 216.61

(56) References Cited

U.S. PATENT DOCUMENTS

| | | | |
|---|---|---|---|
| 4,791,667 A | | 12/1988 | Havel |
| 4,802,199 A | * | 1/1989 | Lange et al. ........... 379/216.01 |
| 4,964,159 A | * | 10/1990 | Son ....................... 379/355.08 |
| 5,337,347 A | * | 8/1994 | Halstead-Nussloch et al. ... 379/88.14 |
| 5,341,415 A | * | 8/1994 | Baran .................... 379/221.02 |
| 5,485,513 A | * | 1/1996 | Goedken et al. ........ 379/355.07 |
| 5,644,633 A | | 7/1997 | Kaufueld et al. |
| 5,668,955 A | * | 9/1997 | deCiutiis et al. ............ 379/130 |
| 5,710,808 A | | 1/1998 | Eaton |
| 5,719,931 A | * | 2/1998 | Johnson ................. 379/355.09 |
| 5,859,896 A | | 1/1999 | Rosen |
| 5,898,756 A | * | 4/1999 | Manning et al. ............... 379/31 |
| 6,137,877 A | * | 10/2000 | Robin et al. ................. 379/352 |

* cited by examiner

*Primary Examiner*—Roland G. Foster
(74) *Attorney, Agent, or Firm*—Michael L. Diaz (57) ABSTRACT

A telephone accessory that is connected to a subscriber's telephone line as an extension, and monitors the line for the initiation of a call from any telephone set. The invention detects a call initiation by determining that a telephone set has seized the line without ring voltage being present immediately beforehand. If the first digit dialed by the subscriber is a "1", the invention immediately dials the remainder of a long-distance access code, without the initial "1", followed by a "1" which signifies a long distance number. This burst of dialed digits takes a short time, after which the subscriber continues to dial the area code and number as normal. The effect for the subscriber is to manually dial a normal long ditance nimber as 1+area code+number, while this invention takes advantage of the fact that long distance access codes begin with "1" and automatically inserts the desired code.

17 Claims, 6 Drawing Sheets

SYSTEM AND METHOD OF AUTODIALING FOR LONG-DISTANCE ACCESS

CROSS-REFERENCE TO RELATED APPLICATIONS AND INCORPORATION BY REFERENCE

This application is a non-provisional application based upon the provisional application entitled "System and Method of Autodialing for Long-Distance Access", filed on Sep. 10, 1999, by David Matthew Smith, now application Ser. No. 60/153,039. Benefit under Title 35 USC §119(e) is hereby claimed for this related application, and it is incorporated by reference in its entirety including figures.

TECHNICAL FIELD OF THE INVENTION

This invention relates to autodialers, specifically to autodialers that dial long-distance access codes.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

The deregulation of long distance telephone service has led to increased competition among service providers. In order for this competition to have value to the consumer, the consumer must be able to easily use different services. For this reason, local telephone companies are required to provide access to any long distance provider by means of an access prefix dialed before the long distance number. However, remembering the prefix and dialing the extra digits are inconveniences to the telephone user, and these inconveniences tend to inhibit many people from trying new services. Thus, more people would take advantage of competitive long distance providers, and competition would be further stimulated, if a convenient means could be provided of dialing the access code whenever any user in a household or small office wanted to place a long distance telephone call.

U.S. Pat. No. 5,644,633 to Kaufeld, et al discloses an autodialer intended to automatically modify a dialed number that meets a preprogrammed criterion, such as 1+ten digits. The invention stores the dial string and, if it meets the criterion disconnects by means of relays the line to the central office (on hook), reconnects the line (off hook), and redials the number along with whatever modifications or prefixes have been previously programmed into the invention. The temporary disconnect signals the central office that the call was aborted, allowing the invention to redial with the modified number.

One disadvantage of this "store and forward" approach is that the autodialer must be connected between the central office and any telephone that is intended to use it. In a residence, for example, several telephone extensions commonly share one telephone line. If a "store and forward" autodialer is to be used with all such extensions, then the residence wiring must be physically disconnected from the wire to the telephone company, and the autodialer installed between the two sets of wiring. This is not a task that consumers will readily undertake.

Other disadvantages should be apparent. The complexity and power required by relays, for example, may make it impractical for such a device to be small and battery-powered with an acceptable battery life.

U.S. Pat. No. 5,859,896 to Howard B. Rosen discloses an autodialer that connects in parallel with the other telephone extensions in a residence, thus avoiding the installation problems of a "store and forward" autodialer. This invention, however, always dials the preprogrammed dialing prefix whenever a telephone extension goes off hook. The prefix might be a local area code or a long distance access code. If the user wishes to dial a number without the prefix such as a local number he must "flash" the telephone hook switch and then redial. The invention senses the "flash" and does not dial the prefix again. One disadvantage of this approach is that the "flash" must be timed by the user to be long enough so that the central office treats the automatically-dialed prefix as an aborted call, while not so long that the autodialer does so also. It will be readily apparent that this method is not well-suited for many consumers, and would probably cause great annoyance.

The present art provides no method for dialing long distance access codes that can be considered a distinct improvement over manual dialing. Therefore, there is a need in the art for an auto dialer that dials a desired long-distance access code without distracting the user who is dialing, and that connects to the user's telephone lines in parallel fashion so as to work with all telephone extensions.

SUMMARY OF THE INVENTION

This invention provides a convenient long-distance access autodialer that connects in a parallel fashion to a telephone line and automatically dials a preprogrammed access code when the user dials the first "1" in a long distance number (i.e., "1"+area code+number). This invention dials the access code without the initial "1," which the user dials, and appends a "1" after dialing the access code, so that the user can continue dialing with the area code. This invention dials the access code as rapidly as the central office permits, so that the user perceives no inconvenient delay when dialing a long distance number.

This invention times the length of the "1" dialed by the user, so that if the "1," exceeds a preset time interval, such as one second, the prefix code is not dialed, permitting a simple means to defeat the autodialer for numbers such as "1411." This invention also times another preset interval after the initial "1," so that if further digits follow quickly, as from a speed-dialing telephone or FAX machine, the prefix code is not dialed.

Finally, this invention is very inexpensive to manufacture, and can be battery operable as an option, with a battery life on the order of a year or more.

In accordance with the present invention, an autodialer comprises a parallel connection to a telephone line, a means of detecting and identifying the first digit dialed when any telephone extension originates a call; means of timing short intervals such as digit duration; and, taking advantage of the fact that all long distance access codes begin with the digit "1," a means of automatically dialing the access code minus the beginning "1" upon detecting a "1" as the first dialed digit, and dialing a "1" after the access code so that the user can continue with the area code and number.

BRIEF DESCRIPTION OF THE DRAWINGS

The figures presented herein when taken in conjunction with the disclosure, form a complete description of the invention.

DETAILED DESCRIPTION OF THE INVENTION

Basic Embodiment

Figure 1A:
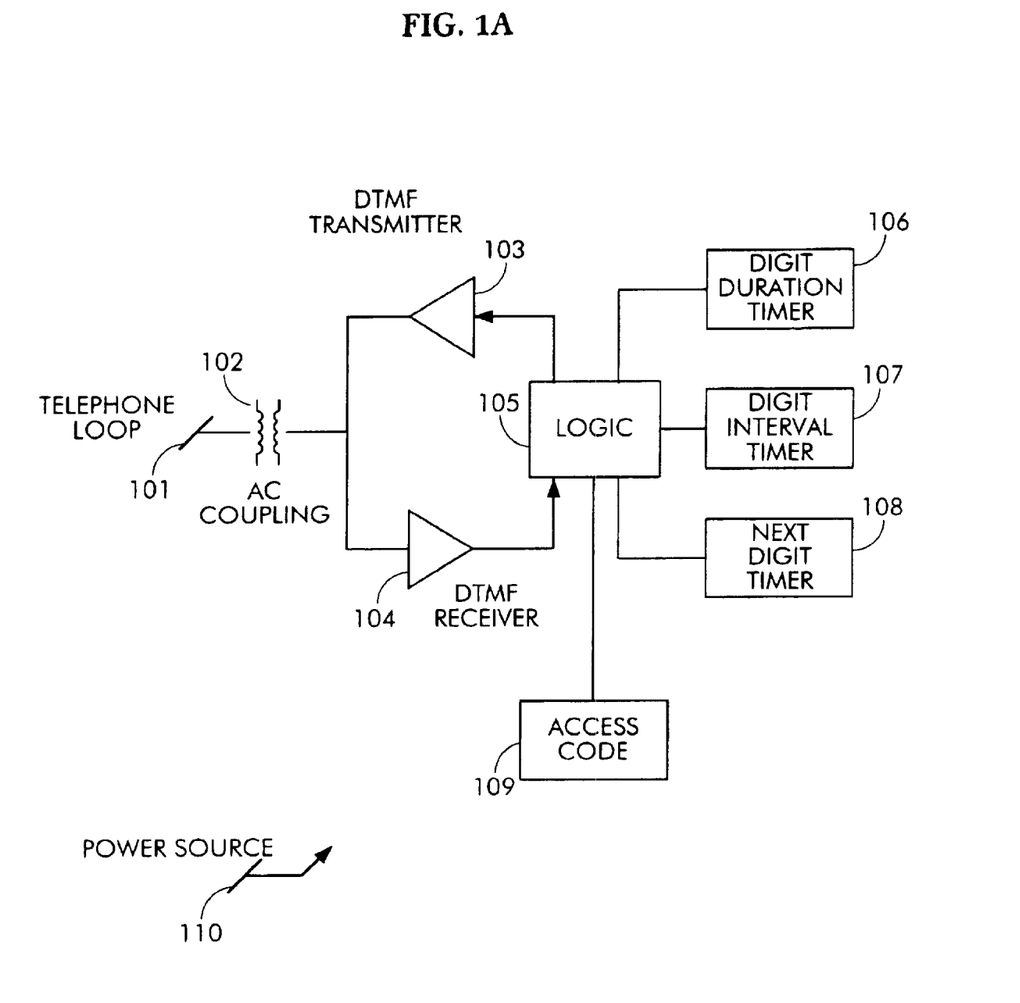
FIG. 1A shows the basic embodiment with discrete timers for marking the various timer intervals necessary, and a separate logic means for controlling the device's operation.

The basic embodiment of the present invention is shown in FIG. 1A. A Telephone Loop 101 is a normal analog telephone line with one or more telephone instruments connected throughout a residence or small office. Telephone Loop 101 is extended to the invention by means of any convenient wiring, such as a standard RJ11-terminated telephone cord, where it connects to an AC Coupling 102. AC Coupling 102 comprises a transformer and a blocking capacitor, preventing flow of direct current through the loop when the autodialer is connected, and providing electrical isolation and longitudinal balance if the autodialer is powered from the AC mains. A DTMF Transmitter 103 is connected to AC Coupling 102 so as to be able to transmit DTMF digits to Telephone Loop 101. A DTMF Receiver 104 is connected to AC Coupling 102 so as to be able to sense and identify DTMF digits that are present on Telephone Loop 101 from any telephone instrument. DTMF Transmitter 103 and DTMF Receiver 104 can easily be the two halves of any readily available DTMF transceiver IC, such as the M8888 manufactured by the Teltone Corporation of Bothell, Wash.

An electronic Logic 105 operates DTMF Transmitter 103 and senses DTMF Receiver 104. An electronic Digit Duration Timer 106, Digit Interval Timer 107, and Next Digit Timer 108 are connected to Logic 105 so that Logic 105 may start and stop each timer and sense whether each timer has expired.

A Programmed Access Code 109 is a set of manually-operated switches, or an electronic memory that retains the desired long distance access code and is connected to Logic 105 so that Logic 105 may retrieve the desired code and sequence it through Transmitter 103. If Access Code 109 is in the form of switches, the user can easily and quickly change long distance service by changing the code.

A Power Source 110 may be any convenient source of power suitable for the electronic components. However, this embodiment draws continuous power while monitoring Telephone Loop 101, and battery power will probably not be practical.

Figure 1B:
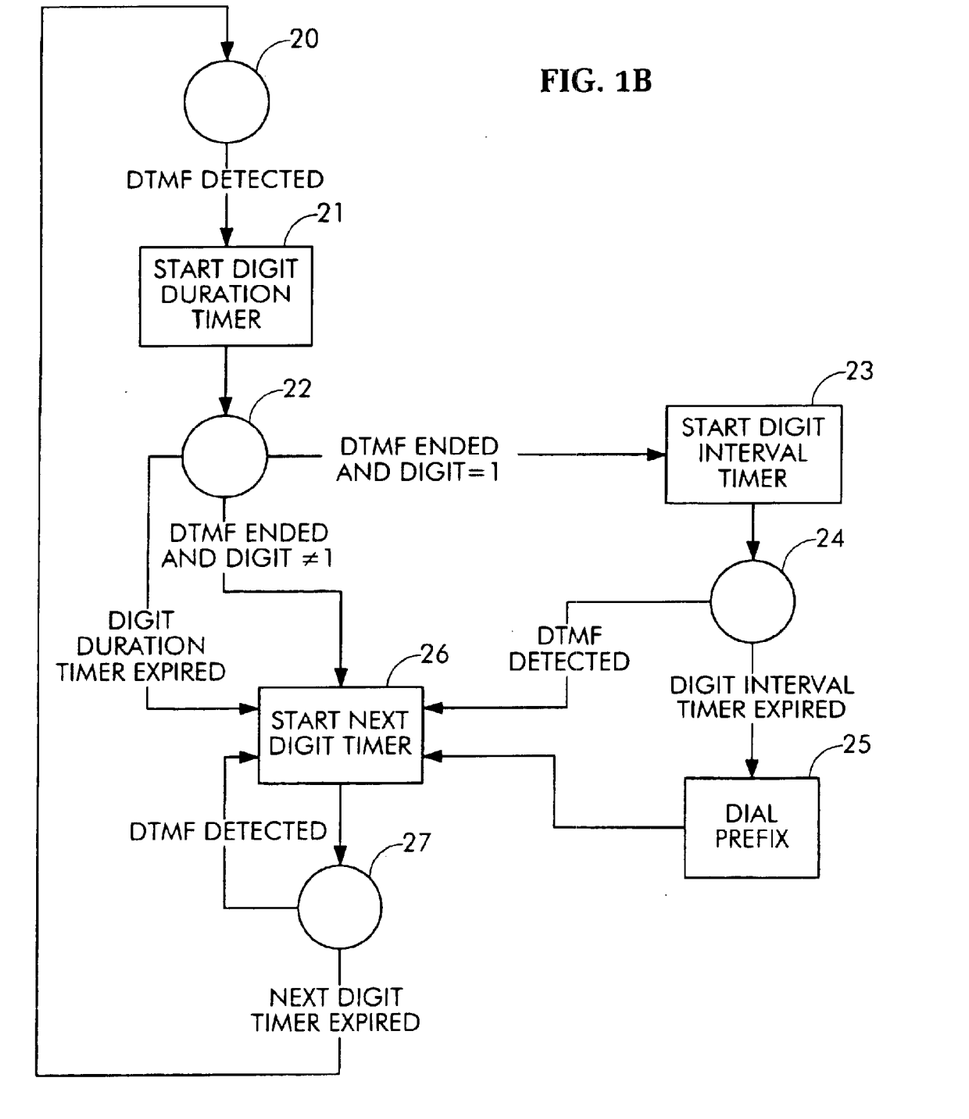
FIG. 1B shows the method of operation for the basic embodiment.

The method of the basic embodiment is shown in FIG. 1B, which depicts the states and actions of Logic 105. A Wait State 20 indicates that the Autodialer is idle and waiting for the first digit to be dialed. Wait State 20 exits as soon as a DTMF signal is detected by DTMF Receiver 104, and Action 21 causes Digit Duration Timer 106 to start.

The autodialer now waits at Wait State 22. If this state exits because Digit Duration Timer 106 expired, or because the DTMF signal ended the digit was not a "1", then Action 26 starts Next Digit Timer 108 which is used in combination with Wait State 27 to determine when the user has finished dialing. If Wait State 27 exits because Next Digit Timer 108 expired, then the user is finished dialing and the Autodialer goes on to Wait State 20 to wait for the next number to be dialed. Thus, the autodialer ignores dialed numbers that do not begin with a "1", or that begin with a digit pressed for longer than the Digit Duration Timer interval, perhaps one second.

If Wait State 22 exits because the DTMF signal ended and the digit was a "1", then Action 23 starts Digit Interval Timer 107. The autodialer now goes to Wait State 24. If Wait State 24 exits because another DTMF signal was detected by DTMF Receiver 104, then the Autodialer proceeds to Action 26 to wait for the user to finish dialing. Thus, the Autodialer ignores a dialed number when the digits come in rapid succession, as from some non-manual source such as a speed dialer. However, if Wait State 24 exits because Digit Interval Timer 107 expired, then Action 25 causes DTMF Transmitter 103 to dial Access Code 109, which comprises the seven digits of a long distance access code, with the leading "1" dialed at the end instead. The user then goes on to dial the rest of his number, while the Autodialer proceeds to Action 25 to wait for dialing to finish.

When the Autodialer determines that the dialing has finished, by exiting Wait State 27 because the Next Digit timer has expired, then it proceeds to Wait State 20 to wait for a new number.

Suppose the user wishes to dial a long distance number, such as "1-617-1234567," and has Access Code 109 programmed for "1010555." The Autodialer idles at Wait State 20. The User presses "1" which causes the Autodialer to proceed through Action 21 to Wait State 22. If the user does not press the "1" key for an unnaturally long timer, then when the key is released the Autodialer proceeds to Action 23 and Wait State 24. If the user does not quickly press the next digit, the Autodialer proceeds to Acton 25 and 26. The telephone company's Central Office receives the sequence "1 (user)-010555-1 (Autodialer)-617-12304567(user)." Note that Access Code 109 is automatically dialed as quick burst, say 0.75 second, after a short pause, perhaps 0.25 second. The user will hear the code dialed, but will be able to dial the complete long distance number at a natural pace.

Suppose instead that the user wished to defeat the Autodialer and dial "1-411" without an access code. The Autodialer is at Wait State 20. The user presses "1" and holds it for a second or so. The Autodialer detects the DTMF signal and proceeds to Action 21 and Wait State 22. Digit Duration timer 106 expires while the user is pressing "1", and the Autodialer proceeds to Action 26 without dialing Access Code 109.

Suppose that the user caused a FAX machine to dial a long distance number. If the FAX machine dials the complete number without pause, then when the Autodialer reaches Wait State 24, it will exit because the DTMF signal corresponding to the digit after the "1" will be detected before Digital Interval Timer 107 expires and Access Code 109 will not be dialed. Thus, the Autodialer will not conflict with the FAX Machine. However, if the user wishes to program a pause after the "1" dialed by the FAX machine (or any other speed dialer), then the Autodialer will dial Access Code 109 during the pause.

Battery-Powered Embodiment

Figure 2A:
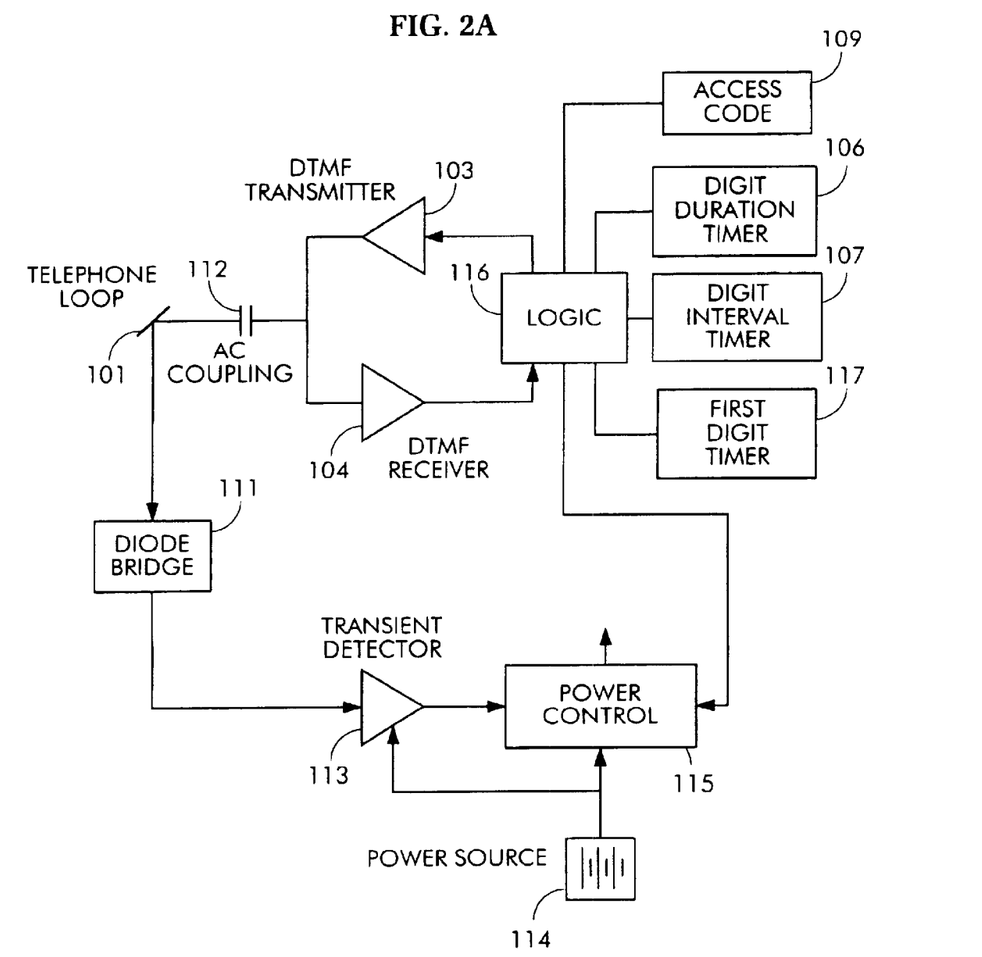
FIG. 2A shows a battery-powered embodiment in which most of the autodialer is powered down until a transient appears on the telephone line, a transient detector to turn power on, and separate logic and timers.

The embodiment shown in FIG. 2A is an evolution of that depicted in FIG. 1A, with the action of a Transient Detector 113, which continuously monitors Telephone Loop 101 for any voltage transient that might indicate that a telephone extension has been taken off hook, and a Power Control 115, which turns power on and off to the rest of the electronic components. Another addition is a First Digit Timer 117, and an electronic Logic 116 which has additional control functions associated with battery operation. A Power Source 114 is a battery capable of operating all of the electronics.

A Diode Bridge 111 is connected to Telephone Loop 101 to provide a polarity-corrected voltage output referenced to the digital ground of the Autodialer. This output is connected to Transient Detector 113. Transient Detector 113 comprises resistors and capacitors to filter the transients, and a transistor or other means to convert a filtered transient into a useful logic pulse output. This output causes Power Control 115 to turn power on. An output from Logic 116 causes Power Control 115 to turn power off.

Since this embodiment is battery powered, there is no requirement to provide isolation from the AC mains and earth ground (as long as the device is housed in an insulated case). For the same reason, longitudinal balance can be maintained without a line transformer. Therefore, AC Coupling 112 is the form of capacitive coupling which is smaller and lighter.

Figure 2B:
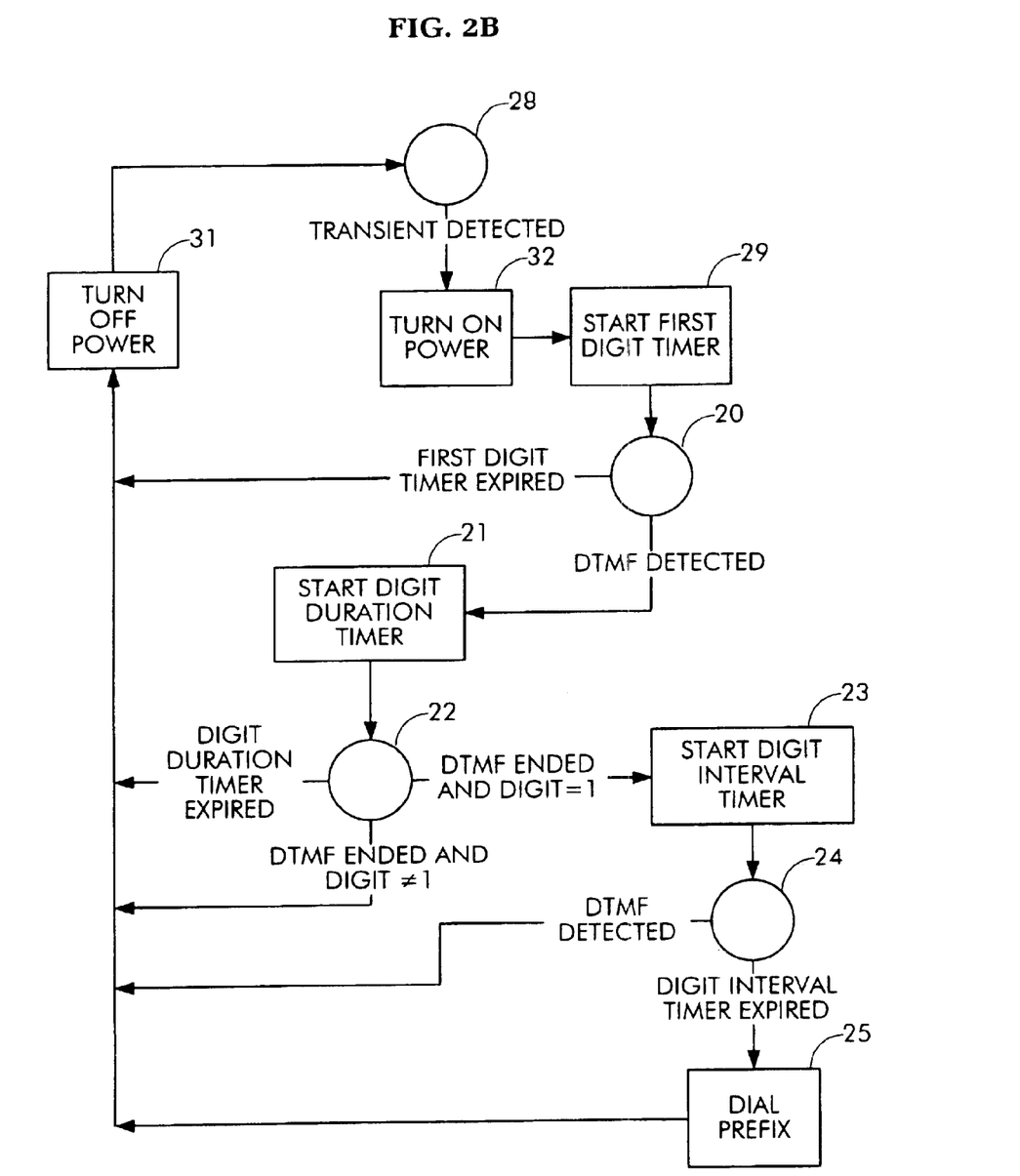
FIG. 2B shows the method of operation for the battery-powered embodiment of FIG. 2A.

The method of the embodiment of FIG. 2A is depicted in FIG. 2B. It is similar to FIG. 1B except that Wait Sate 28 and Actions 29, 31, and 32 have been added, and Action 26 and Wait State 27 have been removed. Wait State 28 is the power-off idle state. Also, since Transient Detector 113 signals the beginning of a call, there is no need to wait for the user to finish dialing the previous number.

When the user picks up a telephone to dial, Wait State 28 exits due to the output from Transient Detector 113, and Action 32 turns power on the rest of the electronics. Immediately, Action 29 starts First Digit Timer 117. If Wait State 20 exits because First Digit Timer 117 expired; then, the user did not dial a number, and might have picked up the telephone to answer a call. The Autodialer then proceeds to Action 31 and Wait State 28, and Power Control 115 disconnects power to the rest of the electronics.

On the other hand, if Wait State 20 exits because a DTMF signal was detected by DTMF Receiver 104, then the operation of the Autodialer proceeds as in the Basic Embodiment. However, this embodiment then proceeds to Action 31, "Turn Off Power," rather than wait for the user to finish dialing.

Preferred Embodiment

Figure 3A:
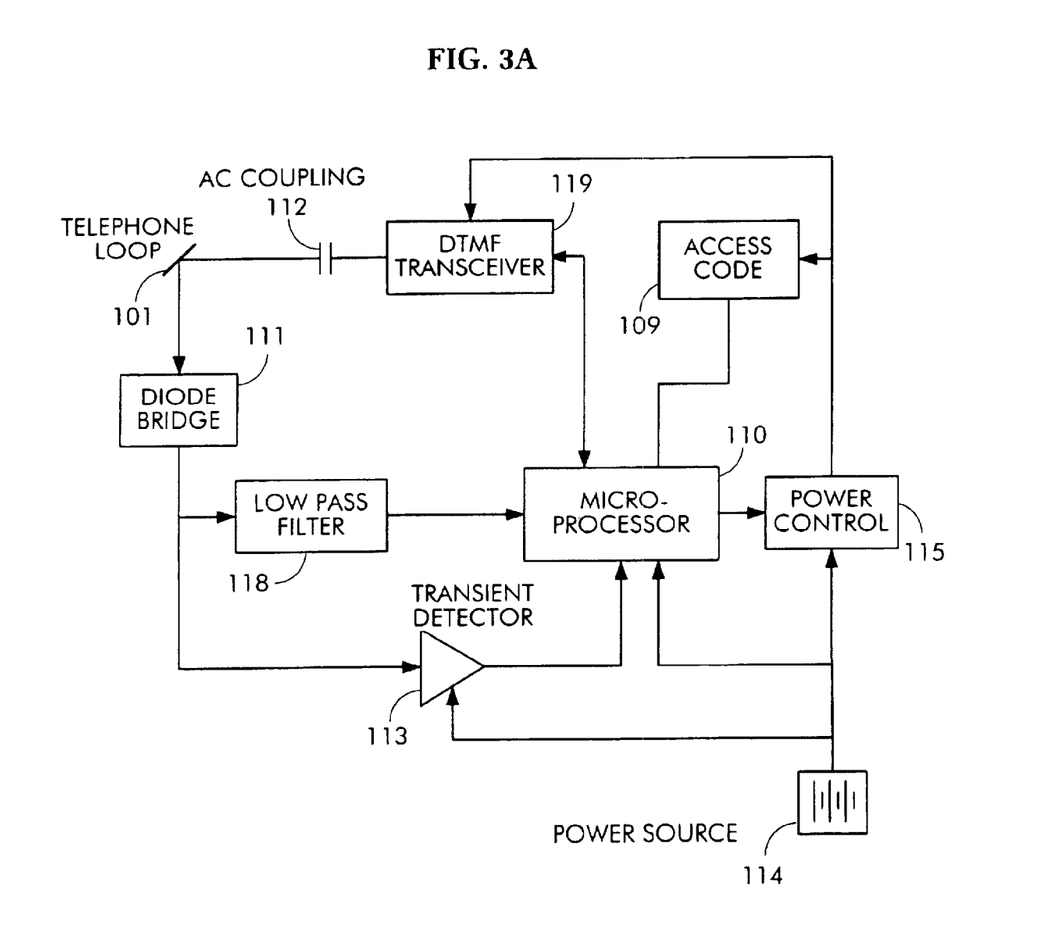
FIG. 3A shows the preferred embodiment battery-powered with the timers and control logic implemented in a microprocessor.

The preferred embodiment is depicted in FIG. 3A.

A DTMF Transceiver 119 comprises both a DTMF transmitter and receiver with a microprocessor-compatible interface. The Teltone M8888 is a suitable IC.

A Microprocessor 110 is an inexpensive microprocessor with an Analog to Digital Converter input and capable of a very low-power "sleep" mode, such as the PIC16C72 manufactured by Microchip Technology Inc. of Chandler. Ariz.

A Low Pass Filter 118 is connected between Diode Bridge 111 and Microprocessor 110's Analog to Digital Converter Input. Low Pass Filter 118 is a combination of resistors and capacitors designed to pass DC voltages and low-frequency ringing signals.

Microprocessor 110 receives battery power continuously, but spends most of the time in "sleep" mode. The PIC16C72 is capable of a sleep mode that drains a few microamperes of supply current. Transient Detector 113 is connected to an input of Microprocessor 110 that is capable of bringing the processor out of sleep mode. Microprocessor 110 uses an output pin to operate Power Control 115, which in turn controls battery power to the rest of the electronics, primarily DTMF Transceiver 119.

Figure 3B:
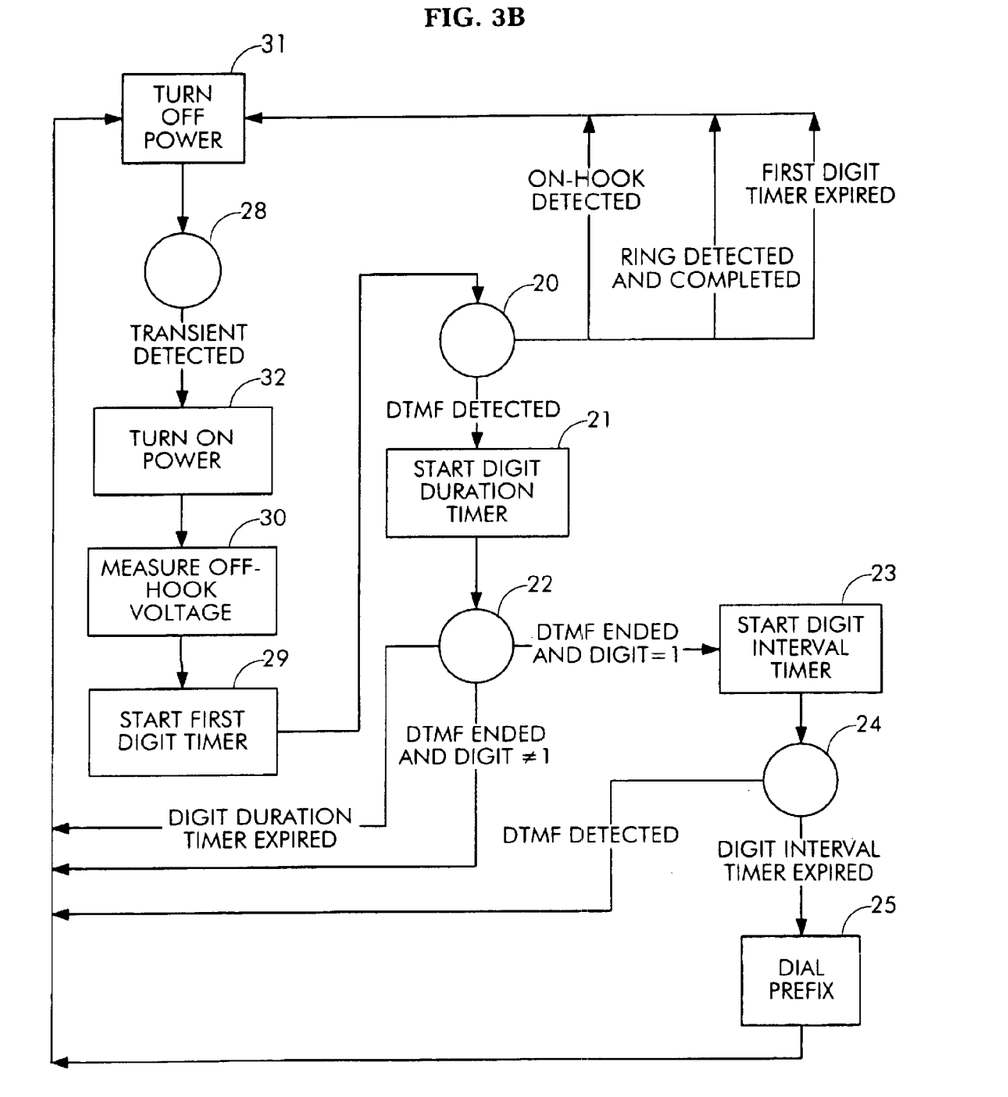
FIG. 3B shows the method of operation of the preferred embodiment.

Refer to the method depicted in FIG. 3B, which describes the logic flow of the software program executed by Microprocessor 110. Note that the timers referred to in Actions 21, 23, and 29 are here implemented using software timing loops or a hardware timer internal to Microprocessor 110. The Autodialer is idle, and Microprocessor 110 is in sleep mode in Wait State 28. A change in voltage on Telephone Loop 101 is detected by Transient Detector 113 and brings the processor out of sleep mode. Wait State 28 thus exits and Action 32 turns on power to the rest of the electronics. Action 30 "Measure Off-Hook Voltage," occurs when Microprocessor 110's Analog to Digital Converter samples and measures the DC voltage on Telephone Loop 101. If a user is initiating a call, this voltage will represent the off-hook voltage of the loop under present conditions with the user's telephone instrument. If later measurements of DC voltage are at least 8V above this initial measurement, then, it is assumed that the user has hung up. (This minimum voltage rise is calculated using the minimum loop current drawn by a telephone of 20 mA and a minimum loop resistance in practice of 400 ohms).

The Autodialer now proceeds to Action 29, "Start First Digit Timer," and to Wait State 20. During Wait State 20, the microprocessor continues to sample and measure the voltage on Telephone Loop 101, as seen through Diode Bridge 111. In this way ringing can be detected as a large AC voltage, and upon completion Wait State 20 will exit and proceed to Action 31, Turn Off Power, and back to Wait State 28. Wait State 20 will exit in the same way if the voltage measurement indicates on hook, or if the first digit timer expires. Any of these exits indicates that the user is not going to dial a number.

On the other hand if Wait State 20 exits because a DTMF signal was detected, then the Autodialer proceeds to Action 21, "Start Digit Duration Time," and continues as in FIG. 2B.

Other Embodiments

As noted above, Programmed Long Distance Access Code 109 is a means for the invention to store and retrieve the access code; said means may be one of several forms. Manual switches, such as the "thumbwheel" type, would allow the user to easily enter or change codes at any time, especially if only the necessary digits of the code have corresponding switches. For example, three switches corresponding to three usual digits must be mounted immediately to the right of a preprinted "1010," so that the user immediately sees that the code us the familiar "1010xxx," where the "xxx" corresponds to the chosen digits programmed into the switches.

Access Code 109 might also be preset before the consumer receives the autodialer. In this case, Access Code 109 could be an internal electronic element, internal switches of the "DIP switch" type, or internally coded into the instructions of Microprocessor 110 so that the user can not readily change the access code. An important commercial application for this would be to distribute to consumers preset autodialers in order to promote a particular long distance service.

Other expedient means of implementing Access Code 109 are conceivable. For example, the invention might be built into a telephone instrument in which case Access Code 109 might be entered into an electronic memory element by means of the telephone dialing keypad.

The present invention comprises any convenient electronic means of sending and receiving DTMF digits, a means of coupling said digits to an analog telephone loop without drawing loop current, electronic logic and timers of any convenient form to detect an initial "1" digit (signifying a long distance number), a means of storing and retrieving a programmed access code, and electronic logic to sequence the access code through the DTMF sender in response to an initial; "1" digit. It will be apparent that the present invention provides its user with a means of remembering and dialing a desired long distance access code with no inconvenience, and after a trivial installation. It should also be apparent that the judicious use of electronic timers in any form allows the user to easily defeat the Autodialer when it is desired to dial a non-long distance number such as "1411." It should also be apparent that a further use of timers allows preprogrammed "speed dialers" and modems to defeat the Autodialer simply by dialing more rapidly than manual dialing, or to enable the Autodialer by using the "Pause" found in nearly all dialers and modems.

It will be recognized by those skilled in the art that modifications and variations to the invention as disclosed can be made without departing from the spirit and scope of the invention. While the above descriptions contain many specifics, these should not be construed as limitations on the scope of the invention, but rather as examples effective and inexpensive embodiments. Other variations are possible, for example using different properties of the telephone line to determine the start of a telephone call such as the presence of dialtone to indicate when to monitor for the first digit or the change in voltage across the line in conjunction with a test for ringing voltage to distinguish originating from answering a call. The present invention does not depend upon the means chosen. The advance in the art represented by the present invention lies in what happens after the dialing starts.

What is claimed is:

1. A method for automatically dialing a predetermined access digit or string of digits on a telephone network by an automatic dialing device, said automatic dialing device having connectivity to the telephone network, said method comprising the steps of:

receiving a first digit by said automatic dialing device from a telephone network, said automatic dialing device having a parallel electrical connection with the telephone network;

decoding a digit value of said first digit;

waiting for a predetermined digit interval of time for reception of a subsequently received second digit from said telephone network;

automatically dialing onto said telephone network a predetermined access digit or string of digits if said predetermined digit interval time is elapsed prior to reception of said the second digit, such that said access digit or string of digits is automatically dialed following completion of the first received digit and prior to reception of subsequently received digits; and measuring the duration of said first digit prior to automatically dialing said access digit or string of digits, and aborting said step of automatically dialing the access digit or string of digits if the measured duration of the first digit exceeds a predetermined maximum value.

2. The method for automatically dialing a predetermined access digit or string of digits on a telephone network by an automatic dialing device as set forth in claim 1 further comprising the step of providing a parallel electrical connection between said automatic dialing device and a telephone network such that said received firth digit may originate from any device connected to send telephone network such as telephones, modems, and facsimile machines.

3. The method for automatically dialing a predetermined access digital or string of digits on a telephone network by an automatic dialing device as set forth in claim 1 wherein said step of receiving a first digit further comprises controlling power modes of portions of and devices within said automatic dialing device such that upon detection of a transient voltage within said telephone network, said portions of and devices within the automatic dialing device are turned on.

4. The method for automatically dialing a predetermined access digit or string of digits on a telephone network by an automatic dialing device as set forth in claim 1 wherein said step of decoding a digit value of said first digit further comprises disabling automatic dialing of an access digit or string of digits if said decoded digit value is equal to any other value than 1.

5. The method for automatically dialing a predetermined access digit or string of digits on a telephone network by an automatic dialing device as set forth in claim 1 further comprising the step of controlling power modes of portions of and devices within said automatic dialing device such that upon completion of dialing said access digit or string of digits, said portions of and devices within the automatic dialing device are turned off.

6. The method for automatically dialing a predetermined access digit or string of digits on a telephone network by an automatic dialing device as set forth in claim 1 further comprising the step of controlling power modes of portions of and devices within said automatic dialing device such that upon reception of a subsequent second digit from said network prior to completion of the step of waiting for a predetermined digit interval time, portions of and devices within the automatic dialing device are turned off thereby aborting the step of automatically dialing the access digit or string of digits.

7. A computer-readable media containing computer code for automatically dialing a predetermined access digit or string of digits on a telephone network by an automatic dialing device, said automatic dialing device having a parallel electrical connectivity to the telephone network and a processor capable of executing computer code, said computer code when executed by said processor causing the automatic dialing device to perform the steps of:

receiving a first digit by said automatic dialing device from a telephone network;

decoding a digit value of said first digit;

waiting for a predetermined digit interval of time for reception of a subsequently received second digit from said telephone network;

automatically dialing onto said telephone network a predetermined access digit or string of digits if said predetermined digit interval time is elapsed prior to reception of said the second digit, such that said access digit or string of digits is automatically dialed following completion of the first received digit and prior to reception of subsequently received digits; and measuring the duration of said first received digit and aborting said step of automatically dialing the access digit or string of digits if said measured duration exceeds a predetermined maximum time value.

8. The computer-readable media as set forth in claim 7 wherein said computer code for receiving a first digit further comprises computer code for controlling power modes of portions of and devices within said automatic dialing device such that upon detection of a transient voltage on the telephone network, said portions of and devices within the automatic dialing device are turned on.

9. The computer-readable media as set forth in claim 7 wherein said computer code for decoding a digit value of said first digit further comprises computer code for disabling automatic dialing of an access digit or string of digits if said decoded digit value is equal to any other value than 1.

10. The computer-readable media as set forth in claim 7 further comprising computer code for controlling power modes of portions of and devices within said automatic dialing device such that upon completion of dialing said access digit or string of digits, said portions of and devices within the automatic dialing device are turned off.

11. The computer-readable media as set forth in claim 7 further comprising computer code for controlling power modes of portions of and devices within said automatic dialing device such that portions of and devices within the automatic dialing device are turned off in response to said first digit duration measurement exceeding said predetermined maximum time value, thereby aborting dialing of the access digit or string of digits.

12. An automatic dialing device for dialing an access digit or string of digits on a telephone network comprising:
   a parallel telephone connection circuit which communicatively connects the automatic dialing device to a telephone network and allows for bi-directional signal transfer between the automatic dialing device and the telephone network; a digit detector which receives, times, and decodes digit signals received from said telephone network;
   a digit transmitter which transmits a digit signal to said telephone network in response to detection of a first digit signal having a pre-determined decoded digit value, such that said digit signal forms an access digit or string of digits which is automatically dialed; and
   an automatic dialer disabler which disables the automatic dialing of an access digit or string of digits in response to said received first digit signal having a duration in excess of a pre-determined maximum first digit length.

13. The automatic dialing device as set forth in claim 12 further comprising:
   an inter-digit timer which measures a pre-determined minimum amount of time following reception of a first digit by said digit detector; and
   an automatic dialer disabler which disables the automatic dialing of an access digit or string of digits in response to reception of a second digit from said telephone network prior to the completion of a pre-determined minimum inters digit time.

14. The automatic dialing device as set forth in claim 12 further comprising a power mode controller which places unnecessary circuits and portions of the automatic dialing device into a low-power mode following completion of dialing of an access digit or string of digits and prior to detection of a first received digit.

15. The automatic dialing device as set forth in claim 12 further comprising a power mode controller which places unnecessary circuits and portions of the automatic dialing device into a low-power mode following disabling the automatic dialing of the access digit or string of digits.

16. The automatic dialing device as set forth in claim 13 further comprising a power mode controller which places unnecessary circuits and portions of the automatic dialing device into a low-power mode following disabling the automatic dialing of the access digit or string of digits.

17. The automatic dialing device as set forth in claim 12 further comprising:
   a transient detector for measuring a detecting voltage transients in said telephone network, said voltage transient indicating an off-hook condition by a telephone device on said telephone network, said transient detector having a "transient detected" output signal; and
   a power mode controller which places circuits and portions of the automatic dialing device into a full-power operational mode upon receipt of the "transient detected" output signal from the transient detector.

* * * * *